Oct. 7, 1947.                H. W. COLLINS                    2,428,654
                           REINFORCED PLASTICS
                          Filed July 1, 1944           2 Sheets-Sheet 1
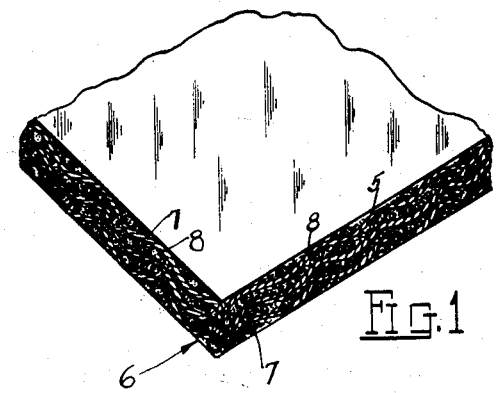
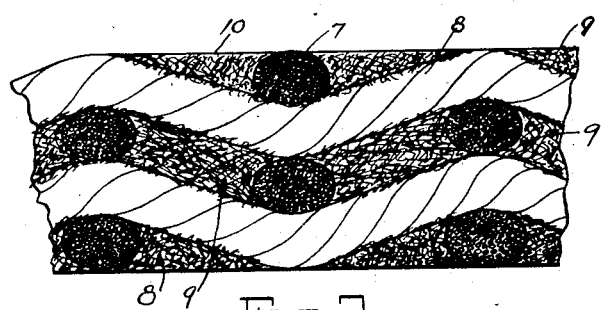
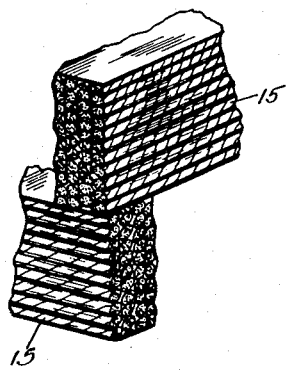
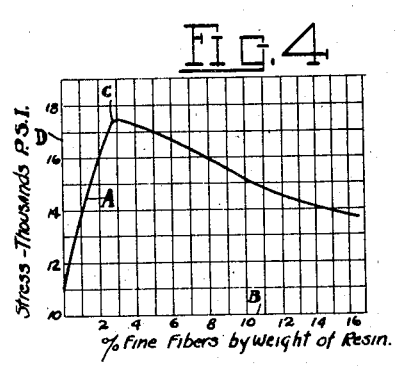
INVENTOR.
Howard W. Collins.
BY
*Staehli & Overman*
Attorneys.

Oct. 7, 1947.     H. W. COLLINS     2,428,654
REINFORCED PLASTICS
Filed July 1, 1944     2 Sheets-Sheet 2
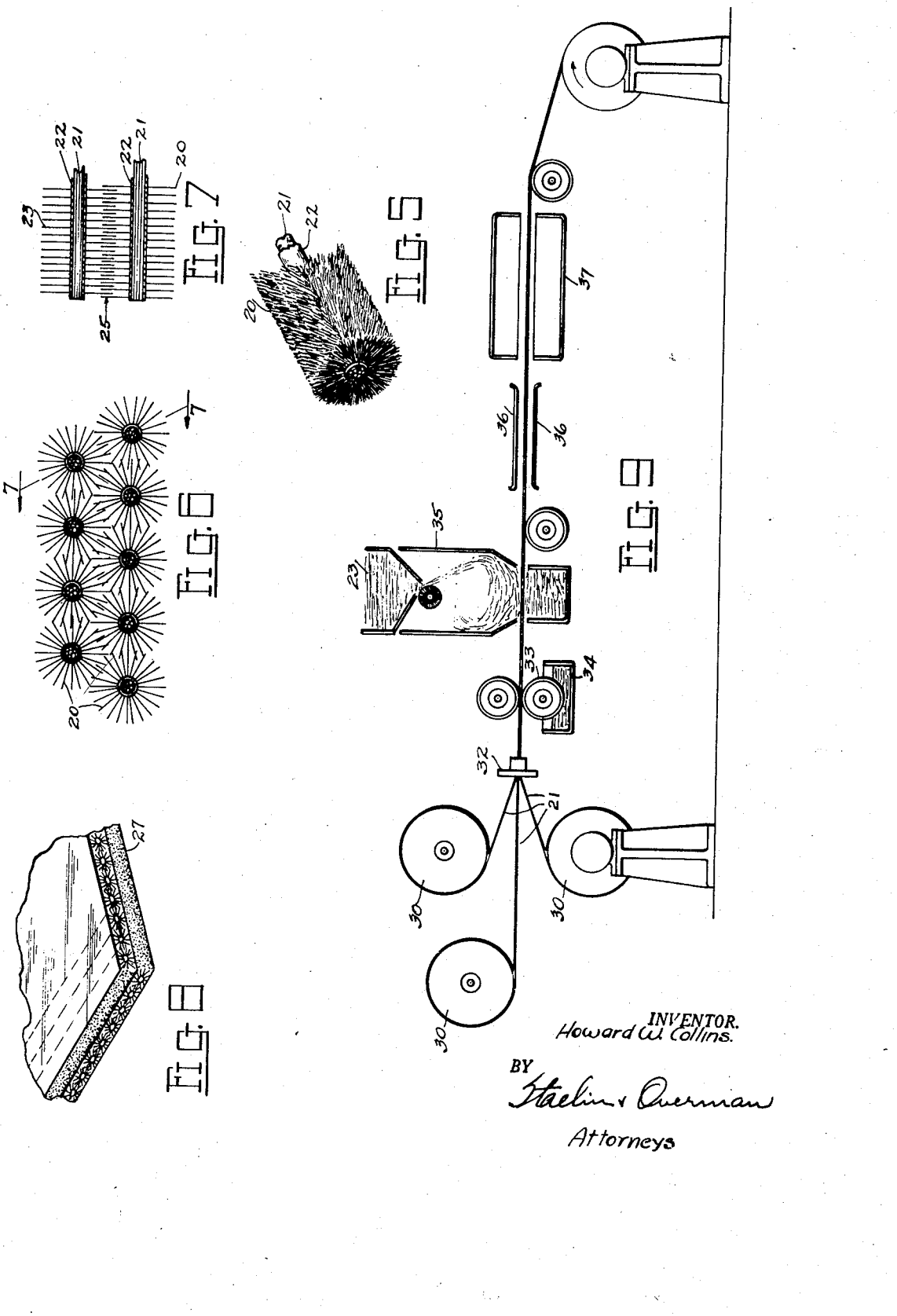

Patented Oct. 7, 1947

2,428,654

UNITED STATES PATENT OFFICE 2,428,654

REINFORCED PLASTIC

Howard W. Collins, Newark, Ohio, assignor to Owens-Corning Fiberglas Corporation, a corporation of Delaware Application July 1, 1944, Serial No. 543,143

4 Claims. (Cl. 154—43)

The present invention relates to improvements in reinforced plastic materials and particularly to sheets or articles of increased strength formed by laminating together plies of resin impregnated reinforcing materials.

The general purpose in the production of composite materials known as plastic laminates is to obtain a product which is highly resistant to stresses and which may be formed from materials having the particular properties desired in the finished product. Laminates generally have greater strength than articles formed from the resinous material alone due to the layers or plies of fibrous material used as reinforcement. The laminates are formed by coating or impregnating with a resinous material thin sheets of paper, wood, or fabric made from glass fibers, cotton, linen, etc. and stacking them one on the other until the desired thickness is reached. The stack is then compressed to insure mutual contact between the plies and expel any air bubbles therefrom and heat is applied thereto to cure or set the resin. Fibrous material felted or otherwise formed into a thin sheet or mat or woven into cloth may also be employed.

The resins normally used are of the thermosetting synthetic type which are heat hardenable and do not soften under further application of heat. Some such synthetic resins are phenol and urea formaldehyde, melamine, polyvinyl butyl resins, and unsaturated ester-styrene copolymers.

Other suitable resins are the methyl ester of methacrylic acid (methylmethacrylate), polyester resins such as MR1A produced by the Marco Chemical Company and allyl alcohol monomer resins such as "Allymer" CR38, CR39 and CR39B$d$, made by Columbia Resin Company. There are also numerous other resins both synthetic and natural which are adaptable to the present use.

In the production of laminates where paper or cloth is used, the filling material may be supplied in continuous roll form to which fluid resin is applied either by a dipping process or by passing the sheets between rollers one of which runs in a bath of resin. Squeeze rolls or a doctor knife may be employed for removing excess resin from the sheet after which the sheet is passed through a drying oven, if desired, to partially polymerize or cure the impregnant. The sheet may then be cut to the desired size.

The resin is preferably in a fluid or highly plasticized state so that it flows readily along the surface of the material and into the interstices of the weave when cloth is used. Resins may be rendered more fluid by the addition of suitable solvents which are later driven off by evaporation such as in the drying oven previously mentioned.

The predominate strength qualities of laminates lie in the incorporation in the laminate of high strength materials to reinforce the finished product. Thus, where glass fibers are woven into cloth and laminates are made therefrom, a very high strength of the reinforced material may be obtained. The reinforcing material is in effect continuous in the directions of the plane of the surface of the plastic laminate and accordingly provides great strength in these directions. But where laminates are subjected to continuous flexural strains and stresses over a period of time and particularly under adverse atmospheric conditions, there is often a tendency to delaminate, that is, the plies tend to separate and thus considerably weaken the material. This is apparently because the reinforcing material is discontinuous in the direction normal to the plane of the laminate surface and the lateral strength of laminates has thus depended mainly on the type of resin used and its ability to resist strains tending to separate the plies.

It is the primary object of the present invention to greatly increase the resistance to delamination of plastic laminates. This is achieved by reinforcing the resinous bond between the plies of material so that adhesion between the plies is improved.

It is another object of the invention to provide a fibrous structure within the body of the laminating resin between the plies so that in effect a continuous fiber structure is provided in the direction perpendicular to the major surface of the laminate.

The addition of masses of loose relatively long fibers of the same diameter as those forming the plies when placed therebetween does not produce the desired strengthening effect. These fibers while having a substantially high degree of flexibility may at times produce voids in the resin and at the same time tend to hold the plies separated.

It is a further object of the present invention to provide a fibrous reinforcement for improving the inter-layer bond in plastic laminates, which eliminates any tendency to form voids therein, and which materially increases the strength of the resin forming the bond.

I have found that the greatest strength in laminates of the present type is obtained when glass fibers in the form of warps of parallel fibers or twisted yarns woven into cloth are used. The glass fibers may be produced by either the process disclosed in the Slayter and Thomas Patent No. 2,133,238 by which continuous type glass fibers are made or the process of the Tucker and Lannan Patent No. 2,264,345 by which slivers of staple type glass fibers are produced.

The present invention is particularly applicable when warps of parallel continuous type fibers are laminated together. The continuous type fibers are relatively smooth in texture and while providing maximum tensile strength in the direction of their length the inter-layer bond depends mainly upon the adhering qualities of the resin to the fiber surfaces. Since there are no filling or crossing strands or fibers to provide interstices into which the resin can flow as in the case of woven material it is all the more desirable that some reinforcing means be provided.

A further object of the invention is to provide a fibrous reinforcing medium for the resin which is capable of complete dispersion in the body of resin and does not hinder the flow thereof when applied to the laminating material.

It is a still further object of the invention to provide a laminable plastic reinforcing means which has an inner lamina reinforcing structure formed integral therewith.

Other objects and advantages may be noted as this description proceeds.

In the accompanying drawings:

Figure 1 is a perspective view of a laminate formed in accordance with the present invention and shown diagrammatically on an enlarged scale;

Figure 2 is an enlarged cross-sectional view through two plies of a laminate;

Figure 3 is a perspective view on an enlarged scale of a warp of parallel fibers treated in accordance with the present invention;

Figure 4 is a graphic illustration of the results obtained in practicing the present invention;

Figure 5 is a perspective view on an enlarged scale of a reinforcing strand;

Figure 6 is an end view of a plurality of such strands in the form of a warp;

Figure 7 is a detail sectional view through the strands taken on the line 7—7 of Figure 6;

Figure 8 is a fragmentary perspective view of a laminate formed from this material; and Figure 9 is a diagrammatic view of an apparatus suitable for applying flocking to a strand.

The glass fibers from which textile yarns and cloths are produced, called textile fibers, have a diameter generally of from .0002 to .0003 inch and the length may be from a few inches to substantially continuous lengths depending upon the process by which they are manufactured. The fibers are gathered into strands or slivers which are then twisted and/or plied into yarns and then woven into cloth. In order that the cloth become thoroughly impregnated with resin it is desirable that the resin be in a relatively highly plasticized state so that it will readily penetrate the strands and surround the individual fibers. Resin in too high a stage of polymerization will not readily flow into the small spaces between the yarns or fibers and thus will not produce a strong laminate.

I have found that the strength of the laminating resin may be materially increased by incorporating therein fine glass fibers in an amount of 2 to 4% by weight of fibers to resin, a suitable average being 3%. These fibers are of extremely small diameter within the range of from .00002 to .00005 inch and which may well average .00004 inch or about one-fifth the diameter of the textile fiber. Fibers of this diameter may be formed by a process in which molten glass is attenuated by a high velocity gaseous blast.

The fine fibers formed by this process are deposited haphazardly on a suitable collecting means from which they are gathered in a mass. A suitable amount of the fibers are then placed in substantially compact relation between rubber platens and pressure of the order of 6000 lbs. per square inch is applied. The fibers are crushed together and break at their points of intersection into a multiplicity of lengths dependent upon their relation to one another within the mass. It has been found that this length varies from 30 to 100 times the diameter of the fibers or roughly .00012 to .004 inches. The fibers may also be reduced to short lengths by ball-milling or hammer-milling.

The fibers thus prepared are then mixed with the resin and suitably stirred to achieve a thorough dispersion of fibers in a heterogeneous arrangement therein. In practice I have found that the resin prepared in the above manner may be applied to the cloth either by a dipping process or by brushing it into the cloth which has been cut into pieces of the desired dimensions.

The fine fibers added to the resin tend to thicken it somewhat but this is not deleterious if care is exercised in applying the resin to insure sufficient penetration of the cloth. A squeegee may be used to good advantage at times in working the resin into the yarns or strands to completely saturate the cloth. This action tends to dispose numbers of the fine fibers suspended in the resin into intimate contact with the larger fibers of the cloth and many of the small fibers will be arranged more or less perpendicular to the cloth surface.

Figure 1 of the drawings illustrates several plies of cloth 5 prepared in the present manner and placed one on the other to form a laminate 6. The cloth illustrated herewith is woven from warp yarns 7 and weft yarns 8, each of twisted and plied strands of glass fibers. The pile or stack 6 is then compressed to expel any air bubbles trapped therein and place the layers in close mutual contact. Heat is applied to the stack while it is held under pressure to completely cure the resin and thus form a solid uniform mass.

Figure 2 illustrates on an enlarged scale the intermingling of the fibers of the cloth with the resin-suspended short fibers 9 with which the layers of cloth 5 are saturated. As each treated layer is placed one on the other their resinous contacting surfaces blend together so that the resin filling the interstices 10 of the cloth becomes a continuous body. The short fibers 9 also tend to interlace and provide a continuous reinforcing structure.

The proportionate relation of length to diameter of the short fibers 9 results in a relatively stiff fiber. This stiffness is increased to a certain extent by reason of the fiber being supported by the viscous resin which prevents sudden shifting of the fiber when pressure is applied thereto. Thus, in impregnating the cloth with the reinforced resin certain of the fibers therein will become bent or folded particularly should the fiber ends impale the strand or enter other crevices. When the resin applicating pressure is removed the fibers may then tend to slowly assume a columnar form which in some instances may cause the fibers to project outwardly from the sheet. As each impregnated sheet is placed on the stack, the projecting fibers from each tend to penetrate the adjacent surface and force the fibers into the yarns or strands of the adjacent sheets. This tendency is increased as laminating pressure is applied to the stack. As a result of this arrangement of the fine fibers between the layers of cloth, a mechanical as well as a resinous bond is created.

Figure 3 illustrates the application of the present invention to a laminate formed of warps 10 of parallel fibers or of parallel yarns of intertwisted fibers, the warps being cross laminated to distribute the strength of the fibers across the plane of the surface. The warps are formed of unwoven or loose lengths of strands or yarns and are preferably completely saturated with resin prepared in the present manner. As a result the fine reinforcing fibers are dispersed throughout the warp. The resin is preferably applied by dipping the warp into the prepared resin but the resin may also be sprayed or brushed onto the strands. The excess resin may then be allowed to drain from the warp or the warp may be passed between squeeze rolls to remove the surplus fluid. The surface tension of the resin draining from the warp tends to draw the warp fibers together in compact relation which leaves the reinforcing fibers firmly embedded within the warp. The action of squeeze rolls also compacts the fibers and the pressure may be regulated to control the final thickness of the warp.

The fine fibers in the resin coating the surface of the warp provide for interlocking with the fibers in adjacent layers when sheets of the warp material are laminated together. Laminates made from warps prepared in the above manner provide a high glass density and the fine fibers reinforcing the resin provide a strong interlayer bond between the sheets of the laminate.

Figure 4 illustrates graphically the increase in strength gained by the use of fine fibers as a reinforcement for the resin, the percentage of fine fibers to the weight of resin being plotted against the strength value gained by their inclusion. The curve A rises sharply at a substantially constant rate along the horizontal scale B to a point C denoting 3% of fiber by weight of resin. This point denotes an average obtained as a result of tests conducted on the resins mentioned herein. From the point C the bond strength of the treated resin decreases more or less gradually as the percentage of fine fibers increases. The vertical scale D indicates in thousands of pounds per square inch the increased compressive strength gained by the addition of fine fibers to the resin.

The value of the present invention is augmented by the fact that the tensile strength of the laminate increases in proportion to the volume of glass contained in the laminate. This has been substantiated by tests which show a tensile strength varying from 45,000 pounds per square inch for 36% of glass by volume of laminate to 47,800 pounds per square inch for 40% glass. The fine fibers which reinforce the resin add further to the total volume of glass in the laminate and thus provide a two-fold advantage.

In the preferred embodiment of the invention I have disclosed one form of plastic reinforcement and Figures 6 to 9, inclusive, of the drawings illustrate a modification thereof in which the strands forming the lamina are individually provided with a reinforcing structure. In this form of the invention I prefer to use continuous strands of glass textile fibers although other types of fibrous materials may be employed. The strands from which the lamina are made may be woven into cloth, arranged heterogeneously into mats, or formed into warps of parallelly arranged strands.

The individual strands 20 as illustrated in Figures 5 and 7 in particular, comprise a core 21 or yarn which is formed by twisting together strands of glass textile fibers of continuous lengths. In order to provide the yarns with an integral reinforcing structure the strands are suitably coated with a resinous material as indicated at 22 in Figure 7. The resin is preferably one which is compatible with the resin from which the laminate is made. While this coating is in a tacky or uncured state, flocking 23 is applied thereto by electrostatic or other suitable means.

The electrostatic application of the fine fibers to the strand causes the fibers to arrange themselves perpendicularly along the strand in all directions and the resulting material has a velvet-like appearance. Also, short fibers disposed at right angles to the axis of the yarn may be secured between the strands as they are twisted in the manner that bristles are held in various types of brushes.

The flocking may be in the form of fine glass fibers preferably having a diameter smaller than the fibers forming the yarn and their length may be up to about ⅛ inch. The length of these fibers may be varied to suit the particular application for which they are employed and may be cut to such lengths by chopping or breaking up loose mats or strands of fibers to the desired size. After the flocking is applied to the coated core, the coating is then dried to securely attach the flock to the strand.

One apparatus by means of which the glass fiber flocking may be electrostatically applied to the strand is illustrated in Figure 9. One or more wound packages 30 of strands are suitably mounted so that each strand or core yarn 21 may be withdrawn and arranged by means of a guide 32 in spaced parallel relation. The strands are then passed over a roll 33 running in a bath of resin 34 which applies the coating 22 to each strand. The coated strands are then passed beneath a hopper 35 from which the flock material 23 is discharged and which adheres to the strands. The strands after passing through the precipitating flock are subjected to an electrostatic force created by electrodes 36 which cause the flock fibers to arrange themselves perpendicular to the core 21. The fibers are held in this position by the tacky condition of the resin while passing through a dryer 37 which cures the resin sufficiently to permanently fix the short fibers.

When strands of this type are arranged in the form of a warp, the flocking on adjacent strands become interwoven as indicated at 25. This provides for a substantially continuous reinforcing structure within the laminate when sheets of material formed in this manner are combined. The surfaces of such sheets present a relatively fuzzy appearance with the fibers therealong projecting outwardly.

When resin from which the laminate is to be formed is applied to the warp by dipping or coating it penetrates the strands and completely encases the fine fibers. The excess resin may be removed from the surface of the warp and the remaining resin impregnating the warp may be partially cured to permit handling. Pieces cut from the prepared warps may then be placed one on the other in a stack and pressure applied thereto in the presence of heat to cure the laminate. The outwardly projecting fibers at the surfaces of the individual sheets interweave with fibers of adjacent sheets as illustrated in Figure 6 and thus produce an interlayer reinforcement.

Figure 8 illustrates diagrammatically a laminate 27 made up of sheets formed from warps of the present material. As shown, the sheets are placed with the strands of each sheet at right angles to each other to provide strength in all directions in the finished laminate.

Modifications may be resorted to within the spirit and scope of the appended claims.

I claim:

1. A reinforced laminated plastic which includes superposed sheets of fibrous glass fabric each impregnated with a resin adhering said sheets together, said resin containing an independent fibrous structure comprising glass fibers having an average diameter of .00004 inch and a length of from 30 to 100 times their diameter.

2. A reinforced laminated plastic which comprises superposed sheets of fibrous glass fabric each impregnated with a resin adhering said sheets together and containing a structure independent of said fabric, including glass fibers having an average diameter within the range of from .00002 to .00005 inch and a length of from 30 to 100 times their diameter.

3. A reinforced plastic laminate comprising a plurality of superposed layers of glass fiber fabric formed of substantially parallelly arranged strands of continuous glass fibers, the fibers of which have an average diameter of .0002 to .0003 inch, said layers being impregnated and adhered together with a resin forming a continuous body therethrough, said resin containing a dispersion of short fine glass fibers independent of said first-named fibers and present in the amount of 3% by weight of resin, said fine fibers having an average diameter within the range of from .00002 to .0001 inch and a length of from 30 to 100 times their diameter, the said fine fibers providing reinforcement transversely of the plane of the fabric.

4. A reinforced plastic laminate comprising a plurality of superposed layers of glass fiber fabric formed of substantially parallelly arranged strands of continuous glass fibers, the fibers of which have an average diameter of .0002 to .0003 inch, said layers being impregnated and adhered together with a resin forming a continuous body therethrough, said resin containing a dispersion of short fine glass fibers in the amount of 2% to 4% by weight of resin, said fine fibers being independent of said first-named fibers and having an average diameter of from one-fifth to one-tenth the diameter of the fibers forming the fabric and a length of from 30 to 100 times their diameter, the said fine fibers providing reinforcement transversely of the plane of the fabric.

HOWARD W. COLLINS.

REFERENCES CITED

The following references are of record in the file of this patent:

UNITED STATES PATENTS

| Number | Name | Date |
| --- | --- | --- |
| 1,726,634 | Smith | Sept. 3, 1929 |
| 2,230,271 | Simpson | Feb. 4, 1941 |
| 2,261,264 | Luty | Nov. 4, 1941 |
| 2,354,110 | Ford et al. | July 18, 1944 |
| 2,176,837 | Ellis | Oct. 17, 1939 |
| 2,217,049 | Greenleaf | Oct. 8, 1940 |
| 2,311,613 | Slayter | Feb. 16, 1943 |
| 2,344,733 | Ripper | Mar. 21, 1944 |
| 2,351,174 | Whitehead | June 13, 1944 |
| 2,328,577 | Oglesby | Sept. 7, 1943 |
| 1,759,976 | Cummings | May 27, 1930 |
| 2,053,123 | Alles | Sept. 1, 1936 |
| 2,314,701 | Harvey | Mar. 23, 1943 |
| 2,377,867 | D'Alelio | June 12, 1945 |